US006881480B2

(12) United States Patent
Hofs et al.

(10) Patent No.: US 6,881,480 B2
(45) Date of Patent: Apr. 19, 2005

(54) CORD MADE FROM POLYESTER FILAMENTS

(75) Inventors: Hendrikus Wilhelmus Jacobus Hofs, Bemmel (NL); Heinrich Johannes Gustav Kiefer, Wuppertal (DE); Henricus Hubertus Wilhelmus Feijen, Velp (NL); Lambert van Duren, Zwolle (NL); Christiaan Jurriaan Maria van den Heuvel, Ellecom (NL); Michael Henricus Jacobus van den Tweel, Woudenberg (NL)

(73) Assignee: Diolen Industrial Fibers B.V., Arnhem (NL)

( * ) Notice: Subject to any disclaimer, the term of this patent is extended or adjusted under 35 U.S.C. 154(b) by 186 days.

(21) Appl. No.: 10/005,148

(22) Filed: Dec. 7, 2001

(65) Prior Publication Data

US 2002/0062893 A1 May 30, 2002

Related U.S. Application Data

(62) Division of application No. 09/283,586, filed on Apr. 1, 1999, now Pat. No. 6,343,654, which is a division of application No. 08/849,775, filed as application No. PCT/EP95/05155 on Dec. 20, 1995, now Pat. No. 5,925,460.

(30) Foreign Application Priority Data

Dec. 23, 1994 (NL) .............................................. 9402205

(51) Int. Cl.[7] .............................. D02G 3/48; B60C 9/00
(52) U.S. Cl. ....................................... 428/395; 152/451
(58) Field of Search ....................... 152/451; 428/364, 428/395

(56) References Cited

U.S. PATENT DOCUMENTS

| | | |
|---|---|---|
| 3,946,100 A | 3/1976 | Davis et al. |
| 4,113,821 A | 9/1978 | Russell et al. |
| 4,195,052 A | 3/1980 | Davis et al. |
| 4,414,169 A | 11/1983 | McClary |
| 4,491,657 A | 1/1985 | Saito et al. |
| 4,973,657 A | 11/1990 | Thaler |
| 5,009,829 A | 4/1991 | Roos |
| 5,049,339 A | 9/1991 | Hrivnak et al. |

FOREIGN PATENT DOCUMENTS

| | | |
|---|---|---|
| DE | 0 173 221 | 3/1986 |
| DE | 0 283 831 | 9/1988 |
| EP | 1 262 812 | 2/1972 |
| EP | 1 262 813 | 2/1972 |
| EP | 0 080 906 | 6/1983 |
| EP | 0 546 859 | 6/1993 |
| EP | 0 440 671 B1 | 1/1997 |
| JP | 57-154410 | 9/1982 |
| JP | 58-203112 | 11/1983 |
| JP | 59-168119 | 9/1984 |
| JP | 61-12952 | 1/1986 |
| JP | 03-199423 | 8/1991 |
| WO | WO 90/00638 | 1/1990 |
| WO | WO 91/07529 | 5/1991 |

OTHER PUBLICATIONS

BISFA—Internationally Agreed Methods for Testing Polyester Filament Yarns, 1983 Edition.

Feirabend, Probleme bei der Doppelbrechungsbestimmung an verstreckten Fäden aus Polyäthylenterephthalat, *Melliand Textiberichte*, 2:13 8–1444 (1976).

Van Wijk/Vink, Gas Chromatographic Determination of the Alcoholic Part of Polyethylene Terephthalate, *ASC. Organ. Coat. Plast. Chem.*, 32: 178–183 (1972).

*PCT International Search Report*, in PCT/EP95/05155 dated Apr. 3, 1996.

BISFA—Internationally Agreed Methods for Testing Polyester Filament Yarns, *The International Bureau for the Standardisation of Man–Made Fibres*, (1995 Edition replaces 1983 Edition).

ASTM D 2256 95a Standard Test Method for Tensile Properties of Yarns by the Single–Strand Method, *Annual Book of ASTM Standards*, vol. 14.02 (pp. 564–572), Sep. 1995.

*Primary Examiner*—Adrienne C. Johnstone
(74) *Attorney, Agent, or Firm*—Oliff & Berridge, PLC

(57) ABSTRACT

A process for manufacturing continuous polyester filament yarn for technical applications from a polymer over 90% of the chains of which are composed of ethylene terephthalate units, via a one-step spinning process, with the undrawn filaments having a crystallinity smaller than 16% and the yarn being wound at a rate larger than 6000 m/min. The yarn obtained in this fashion is particularly suitable for use as reinforcing material in rubber articles, notably as reinforcing material in pneumatic tires for cars. The polyester filament yarn can be used to make cords of uncommonly high dimensional stability and a unique combination of breaking tenacity, shrinkage, and breaking toughness.

4 Claims, No Drawings

# CORD MADE FROM POLYESTER FILAMENTS

This is a division of application Ser. No. 09/283,586 filed Apr. 1, 1999, now U.S. Pat. No. 6,343,654 which in turn is a Divisional Application of application Ser. No. 08/849,775 filed Jun. 12, 1997, now U.S. Pat. No. 5,925,460 which is a National Stage of PCT No. PCT/EP95/05155 filed on Dec. 20, 1995. The entire disclosure of the prior applications is hereby incorporated by reference herein in its entirety.

BACKGROUND OF THE INVENTION

European Patent application EP 80 906 describes a process for the production of polyester filament yarn for technical applications by melt-spinning a polyester-containing polymer in which all process elements are covered in a single process pass. Such a process is also known as a one-step process. It is indicated in this publication that in such a process it is preferred to select a winding speed of less than 5500 m/min, since higher winding speeds will give rise to filamentation and difficulty in operation.

However, an increase in the winding speed is desired. When manufacturing polyester filament yarn for technical applications on an industrial scale, it is advantageous to produce the largest possible quantity of yarn per unit of time on an appropriate apparatus. One of the ways of increasing the quantity of yarn produced per unit of time lies in a higher winding speed.

U.S. Pat. No. 4,491,657 also discloses the process mentioned in the opening paragraph. This patent states that the winding speed of the yarn in such a one-step process is not less than 6.5 km/min. However, there are no examples in this patent of polyester filament yarns for technical applications made by such a one-step process at such a winding speed, nor is there any teaching on how to solve the problems which were found to occur when making polyester filament yarns for technical applications at such winding speeds.

Patent application WO 90/00638 indicates that in a one-step spinning process an increase in the spinning speed goes hand in hand with increased crystallinity of the as yet undrawn filaments. Yarn wound at a speed of about 4800 m/min can be obtained from undrawn filaments having a crystallinity in the range of 13 to 18%.

SUMMARY OF THE INVENTION

The invention pertains to a process which makes it possible to manufacture polyester filament yarn for technical applications at high winding speeds without the aforementioned problems occurring. The term winding speed in this context is defined as the peripheral velocity of the package being wound.

DETAILED DESCRIPTION OF PREFERRED EMBODIMENTS

The invention pertains to a process for manufacturing polyester filament yarn for technical applications by spinning a polymer over 90% of the chains of which are composed of ethylene terephthalate units, with the spinning process having the following elements:

- extruding the polymer in the molten state through a spinneret plate,
- passing the thus formed filaments through a heated zone and a cooling zone in that order,
- fixing the filament speed,
- drawing the filaments to a length of 1.5 to 3.5 times their original length, and
- winding the resulting filament yarn, with all elements being covered in a single process pass.

The invention consists in that when manufacturing polyester filament yarn for technical applications in the manner described in the above paragraph,

- the filaments prior to being drawn have a crystallinity smaller than 16% and
- the winding speed of the yarn is larger than 6000 m/min.

Surprisingly, it has proved possible to make polyester yarn for technical applications using a higher winding speed than the one commonly used so far when manufacturing such a yarn. The process conditions selected should be such that at a yarn winding speed above 6000 m/min, the crystallinity of the undrawn filaments is smaller than 16%.

It was found that if at such winding speeds the undrawn filaments have a crystallinity in excess of 16%, the result will be an unstable spinning process with a great deal of filamentation in the drawn yarn or a process which does not result in a yarn with advantageous use properties.

The crystallinity of the undrawn filaments can, e.g., be affected by: the polymer viscosity, the spinning temperature, the length of the heated zone, the temperature in the heated zone, the degree of cooling in the cooling zone, and the mass per unit length (linear density) of the filaments.

It is preferred, when making polyester filament yarn for technical applications according to the invention, to employ polyester polymer at least 90% of the polymer chains of which are composed of ethylene terephthalate units and which has a relative viscosity ($\eta_{rel}$) of 2.04 to 2.60, preferably of 2.04 to 2.42, more in particular of 2.15 to 2.35. All other process conditions remaining unchanged, a lower relative viscosity of the polymer will generally lead to a lower crystallinity of the undrawn filaments.

It is preferred, when making polyester filament yarn with advantageous use properties according to the invention, to employ polyester polymer with a DEG (diethylene glycol) content of less than 2.5 wt. %, especially of less than 1 wt. %, more particularly of less than 0.8 wt. %. This can be achieved, e.g., by using dimethyl terephthalate as one of the constituents in the polymerization reaction. All other process conditions remaining unchanged, a reduction of the DEG content in the polymer will generally lead to an increase in the crystallinity of the undrawn filaments.

Further, the polymerisation reaction is preferably carried out such that the polymer obtained will have a low carboxyl end groups content. In the polymer to be spun this content preferably is less than 15, more particularly less than 10, milli-equivalents/kg. Such can be achieved, e.g., by performing the polymerisation reaction under mild conditions.

For the stability of the spinning process it is preferred that the polymer contain as few impurities, such as dust and other minute particles, as possible. Alternatively, adjuvants such as titanium dioxide may be added to the polymer to improve the spinning behaviour. Furthermore, it is preferred for the polymer to be as completely anhydrous as possible. The polymer preferably contains less than 40 ppm, more particularly less than 20 ppm, of water.

The polymer is fed to a spinneret plate in the molten state, e.g., by means of an extruder. To this end small pieces of polymer (so-called polymer chips) can be charged to an extruder, the temperature in the extruder causing the chips to melt. The extruder feeds a spinning pump, which conveys the most constant polymer stream possible to a spinneret plate. The spinneret plate is heated to a temperature in the range of $T_m$ to $T_m+100°$ C., with $T_m$ representing the melting temperature of the polymer, preferably to a temperature in the range of $T_m+20$ C. to $T_m+70°$ C. All other process conditions remaining unchanged, an increase in the spinning temperature will generally lead to a reduction of the crystallinity of the undrawn filaments.

Preferably, a single spinneret plate is employed to spin the total number of filaments of one bundle. The spinneret plate preferably has 100 to 1000 spinning orifices, more particularly 200 to 400 spinning orifices. All other process conditions (such as the total polymer throughput through all the spinning orifices) remaining unchanged, reducing the number of spinning orifices will generally lead to a reduction of the crystallinity of the undrawn filaments.

If so desired, additional members can be placed between the extruder, the spinning pump, and the spinneret plate, such as filters to clear the polymer stream of minute particles, static or dynamic mixers to homogenise the polymer stream, or heat exchangers to adjust the temperature of the polymer stream.

To minimize the differences among the filaments in the bundle as much as possible, it is preferred that the spinning orifices be distributed over the spinneret plate in a regular pattern. The capillary inlet opening may be variously shaped, e.g., conically, like a trumpet, or in some other shape known to a skilled person, to facilitate the polymer inflow. The capillary outlet opening preferably is cylindrical, the length/diameter ratio (L/D ratio) being 0.5 to 5, more particularly 1 to 3. Alternatively, the capillary's shape may be such as will exert a positive, constant elongation of flow on the polymer stream.

The throughput per spinning orifice is dependent on the desired filament count of the drawn filaments and the spinning rate.

As is customary in melt-spinning processes, the arrangement of the spinneret plate is such that the capillaries are as parallel with the filament discharge direction as possible. To ensure that the possible differences in temperature in the spinneret plate are kept as low as possible during the spinning process, the spinneret plate can be heated from the bottom, e.g., by infrared heaters. Examples of such thermal radiators are provided in Netherlands patent applications NL 7001370 and NL 7001573.

Immediately beneath the spinneret plate is a heated zone, where such a temperature is set as can lead to plastic deformation of the newly formed filaments. The heated zone may take the form of a heated tube of sufficiently large dimensions to ensure unimpeded passage of all the filaments. The selected cross-section of the heated tube may be the same as, e.g., the cross-section of the spinneret plate. It is preferred to heat this tube in such a way as to give the most homogeneous temperature possible crosswise in the tube, while in the tube's longitudinal direction the temperature is as homogeneous as possible or else subject to gradual change. The temperature in the heated tube on the side abutting against the spinneret plate is in the range of $T_m$ to $T_m+150°$ C., preferably in the range of $T_m+30°$ C. to $T_m+100°$ C. If the temperature is subject to gradual change in the tube's longitudinal direction, it is generally highest on the side of the tube abutting against the spinneret plate (the top). In that case the temperature at the bottom of the tube is preferably in the range of $T_m-100°$ C. to $T_m$. Alternatively, the temperature at the top of the tube may be lower than the temperature at the bottom. The desired temperature in this zone can be reached not only by heating the tube but also by blowing in a heated gas, e.g., heated nitrogen or air. All other process conditions remaining unchanged, increasing the temperature in the heated zone will generally result in a reduction of the crystallinity of the undrawn filaments.

The length of the heated zone ranges from 0.05 to 1.00 m, more particularly from 0.15 to 0.50 m. All other process conditions remaining unchanged, extending the heated zone will generally result in a reduction of the crystallinity of the undrawn filaments.

Subsequent to the heated zone there is a cooling zone. In this zone the temperature of the filaments is lowered to below the glass transition temperature $T_g$. Cooling can be carried out in various ways known to the skilled person. For instance, the filaments can be passed through a layer of gas of sufficiently low temperature, or a gas of sufficiently low temperature can be blown in the direction of the filaments. It is preferred in this case to cool the filaments as evenly as possible, preferably with care being taken to ensure minimal differences among the filaments in the bundle. Such can be achieved, e.g., by blowing air at the filament bundle from all sides. A highly suitable embodiment of the invention consists in passing the filament bundle through a tube which has a sufficiently large cross-section for the unimpeded passage of all filaments and a perforated or porous wall, e.g., a tube of sintered metal or wire mesh. A gas of sufficiently high temperature can be sucked into the tube from the outside by the filament bundle's speed, a process known as "self-suction." It is preferred, however, to blow a gas of sufficiently high temperature, e.g., air, through the tube at the filament bundle, preferably with special attention being given to homogeneous blowing at the yarn from all sides. The gas preferably has a temperature in the range of 10° to 100° C., more particularly in the range of 20° to 60° C. The quantity of gas introduced is dependent on the spinning speed and is preferably in the range of 50 to 500 Nm³/hour. The air velocity in the cooling zone preferably is in the range of 5 to 100 cm/s, more particularly in the range of 10 to 45 cm/s. The air velocity is measured on the inside of the tube, along its wall in a direction perpendicular to the direction of running of the yarn.

To further improve the running behaviour of the filament bundle there may be a small opening between the heated zone and the cooling zone, to allow air to be released from the top of the cooling zone.

In a highly suitable embodiment of the process according to the invention the flow resistance to gas of the wall of the perforated tube in the cooling zone is not constant over the entire length of the tube, e.g., the flow resistance of the tube wall is lower at the top of the tube than at its bottom, or the flow resistance in the middle of the tube differs from that at its top or bottom.

All other process conditions remaining unchanged, increasing the air velocity in the cooling zone will generally result in an increase in the crystallinity of the undrawn filaments.

When the filament bundle leaves the cooling zone, the bundle's temperature should be low enough for it to be passed over or along rotating or static guiding elements without the filaments or the bundle being permanently deformed. To facilitate further processing of the filament bundle, the filaments can be finished beyond the cooling zone. This finish can serve, e.g., to facilitate the drawing of the filaments or to reduce their static load. The finish can be applied with various finish applicators, such as a kiss roll or a finish wheel.

After the filament bundle has left the cooling zone and, if so desired, a finish has been applied to the filaments, the speed of the bundle (the spinning speed) is fixed, e.g., by passing the bundle several times across one or more godets (the first pair of godets). If the yarn is passed across several godets, the speed of the godets preferably is such that there is no drawing between the godets. The godets can be heated if so desired. The spinning speed preferably is higher than 2500 m/min, especially higher than 3500 m/min, more particularly higher than 4000 m/min.

To measure the crystallinity of the undrawn filaments, the yarn has to be wound after the speed of the bundle has been fixed. The crystallinity of the undrawn filaments (the so-called as-spun product) can be determined as indicated in this description. As was stated earlier, the crystallinity of the spun product is smaller than 60%. It was found that if crystallinity of the undrawn filament is 5 to 14%, preferably 7.5 to 12%, a yarn can be obtained according to the process of the invention which after it has been made into a cord and the cord subjected to the conventional treatments known to the skilled person to make it suitable for use in rubber articles subjected to dynamic load, e.g., pneumatic tires for cars, will possess a unique combination of properties, such as dimensional stability, breaking toughness, and strength.

Also other properties of the as-spun product, such as the birefringence ($\Delta n_s$), can be measured. As-spun product obtained in the aforesaid manner preferably has a birefringence in the range of 0.030 to 0.120, more particularly in the range of 0.040 to 0.080.

In the process according to the invention for manufacturing polyester filament yarn for technical applications the as-spun product is not wound, but drawn immediately after the spinning speed has been fixed. The bundle is guided from the first pair of godets to a next godet or several godets, the so-called second pair of godets. The speed of the second pair of godets is set such that between the first and the second pair of godets the bundle is drawn 1.3 to 3.5 times, preferably between 1.5 and 2.5 times. To facilitate the drawing of the bundle, the bundle maybe fixed between the first and the second pair of godets, e.g., with the aid of a drawing point localiser. The drawing point localiser used may be a blower or a cyclone.

It was found that if the yarn is drawn in one step, it is advantageous to draw the bundle under such conditions that the temperature of the first pair of godets is below $T_g+60$. Drawing the bundle in this way is preferably performed with the temperature of the first pair of godets selected in the range of 50° to 90° C.

The temperature of the second pair of godets is dependent on the further processing steps for the thus obtained bundle.

If the bundle is passed from the second pair of godets to a next godet or several godets, the so-called third pair of godets, without being drawn between the second and the third pair of godets but rather, say, relaxed, the temperature of the second pair of godets preferably is selected in the range of 200° to 250° C., more particularly in the range of 235° to 245° C. In that case the speed selected for the third pair of godets preferably is 0.1 to 10% lower than the speed of the second pair of godets. The temperature of the third pair of godets preferably is selected in the range of 140° to 200° C.

If the bundle is passed from the second pair of godets to a next godet or several godets, the so-called third pair of godets, without being drawn between the second and the third pair of godets but rather, say, relaxed, the temperature of the second pair of godets preferably is selected in the range of 200° to 250°, more particularly in the range of godets preferably is 0.1 to 10% lower than the speed of the second pair of godets. The temperature of the third pair of godets preferably is selected in the range of 140° to 200° C.

After the bundle has been drawn and, optionally, relaxed and polyester filament yarn has been formed, the thus obtained yarn can be wound. The winding speed of the yarn is dependent on the spinning speed and the overall degree of drawing of the bundle and is larger than 6000 m/min, more particularly in the range of from 6500 to 8000 m/min. The apparatus used for winding the yarn should be such as will enable even winding of the yarn on a tube at the winding speed, forming an evenly made package, and should make a good transfer tail.

The invention also pertains to a polyester filament yarn and to a cord obtained by using such polyester filament yarn.

Polyester filament yarn obtained by the process according to the invention is highly suited to be used as yarn for technical applications, e.g., as reinforcing material in hose, rubber articles capable of sustaining mechanical load, such as V-belts, conveyor belts, and pneumatic tires, more particularly pneumatic tires for cars, or in tarpaulins. It possesses the following combination of advantageous use properties:

yarn strength $\geq$ 650 mN/tex, elongation at break>10%, and breaking toughness>40 J/g.

The yarn's particularly favourable properties can be shown in treated cords made from these yarns. These cords possess the following unique combination of properties:

breaking tenacity (BT) $\geq$ 570 mN/tex, dimensional stability (DSF)>110, and quality factor ($Q_f$)>50.

The cords preferably have a quality factor above 100, especially above 125, more particularly above 150.

The dimensional stability is calculated from the shrinkage (HAS) as per the following equation:

$$\text{dimensional stability } (DSF) = 185/HAS.$$

The quality factor $Q_f$ is a measure of the unique combination of these cords' breaking tenacity (BT), dimensional stability (DSF), and breaking toughness (BTo).

The quality factor $Q_f$ is calculated as per the following equation:

$$Q_f = (BT-570) + (DSF-110) + 8 \times (BTo-55).$$

To test this unique combination of properties, the yarn is twisted, corded, and dipped using a procedure which is highly suitable for comparative purposes and, moreover, fits in well with the treatments such a yarn would be subjected to if it were used as reinforcing material in rubber articles.

This procedure is carried out as follows:

On a Lezzeni twister a yarn with a linear density of about 1100 dtex is processed into a 1100 dtex×Z335×3 S335 greige cord construction.

Next, there is applied to the resulting greige cord a water-dispersed blocked isocyanate, e.g., a dispersion of 5.5 wt. % of blocked diisocyanate, such as caprolactam blocked methylene diphenyl isocyanate, in an aqueous solution of an epoxide, e.g., an aliphatic epoxide. After this the cord is dried for 120 seconds in a hot-air oven at a temperature of 150° C. and under a load of 20 mN/tex.

The first drying step is followed straightaway by a hot drawing step. This hot drawing step is carried out in a hot-air oven also, for 45 seconds, at a temperature of 240° C., and under a load of 70 mN/tex.

After the hot drawing step the cord is passed through a second dipping bath filled with a dispersion of 20 wt. % of resorcinol formaldehyde latex in water, after which it is dried in a hot-air oven for 120 seconds at a temperature of 220° C.

During this last drying treatment of the yarn the load selected is should be such as will give the formed cord a TASE 5%=185 mN/tex. In actual practice, this load was found to be in the range of 5 to 20 mN/tex.

The above three greige cord treatment steps can be carried out, e.g., in a single-cord Litzer Computreater dipping unit.

The properties of cords obtained in this manner can also be attained by interpolation of the respective cord properties with a slightly (maximally 10%) higher and lower TASE 5% value for comparison with each other. Thus, by linear interpolation to TASE 5%=185 mN/tex, values can be obtained for the breaking tenacity, elongation at break, linear density, shrinkage, and breaking toughness.

Measuring Methods

The birefringence of the spun product, $\Delta n_s$, can be measured with a Jenapol U polarisation microscope on ten different filaments cut on the bias, in accordance with De S enarmont's method. This method is described, int. al., by J. Feierabend in *Melliand Textilberichte* 2/1976, 138–144.

The immersion liquid used may be dibutyl phthalate. Monochromatic light can be produced with a halogen lamp and a dispersion filter (wavelength 558.5 nm). The average birefringence of ten filaments constitutes the birefringence of a sample.

The crystallinity of the as-spun product, $V_{cs}$, can be calculated from the density of the as-spun product. The density of the as-spun product, $e_s$, can be determined as follows:

Three pieces of as-spun product are knotted and cut on either side of the knot, giving a sample length of 0.5 to 1 cm. The samples are washed in petroleum ether to remove the finish if any, and then introduced into a Davenport column containing a mixture of n-heptane and tetrachloromethane of a temperature of 230° C., which column has a virtually linear density gradient with a range of 80 kg/m³ over a difference in height of at least 60 cm. Gauge balls of a known density have been distributed evenly over this range. The position of the gauge balls and the samples is read six hours after the samples have been introduced into the column. By fitting the position of the gauge balls to a polynome of a third degree, the density gradient is determined with each measurement. Using the fitted density gradient, the density of the samples can be determined from the position of the samples in the column. The average density of three samples constitutes the density of the as-spun product.

$V_{cs}$ can be determined with the aid of the following formula:

$$V_{cs}=(e_s-e_a)/(e_c-e_a),$$

wherein $e_a$ is the density of amorphous polyester (1335 kg/m³) and $e_c$ is the density of crystalline polyester (1529 kg/m³).

In accordance with ASTM 02256 the mechanical properties of the yarn, such as breaking tenacity (in mN/tex), elongation at break (in %), and breaking toughness (in J/g), can be determined with an Instron dynamometer, the length between grips being 50 cm. To prevent inter-thread slippage at the clamps, the use of curved clamps is preferred in this measurement. The linear density of the yarn is preferably determined by weighing.

The cord properties are measured after at least 16 hours of conditioning in a standard atmosphere in accordance with ISO 139.

The breaking tenacity (BT in mN/tex), breaking toughness (BTo in J/g), and TASE 5% (in mN/tex) of the cord can be determined in accordance with ASTM 0885M-85 ("Tire codes, tire cord fabrics, and industrial filament yarns made from man-made organic base fibers"), with TASE 5% being calculated from the FASE 5 value as per the following formula:

$$TASE\ 5\%=(FASE\ 5(N)/\text{titer }(dtex))\times 10^4,$$

with the linear density also being determined in accordance with ASTM 0885M-85 and corrected for dip pick up (DPU) besides. The dip pick up can be determined as specified by BISFA (*Internationally agreed methods for testing polyester filament yarns*, 1983 edition).

The shrinkage (HAS in %) of the cord can be determined in accordance with ASTM 04974-89 (Thermal shrinkage of yarn and cord using the testrite thermal shrinkage oven).

The relative viscosity of the polymer can be determined by measuring the flow time of a solution of 1 g of polymer in 125 g of a mixture of 2,4,6-trichlorophenol and phenol (TCF/F, 7:10 (m/m)) at 25° C. in an Ubbelohde (DIN 51562) viscometer, type II (capillary I.D. 1.13 mm). The solution can be prepared by dissolving the sample in TCF/F for 15 minutes at 135° C.

The flow time of the solvent is measured under the same conditions. Next, the relative viscosity in TCF/F is calculated as the ratio between the recorded flow times.

The DEG content of the polymer can be determined in accordance with the method described by R. van Wijk and D. Vink in *ACS. Org. Coat. Plast. Chem.* 32 (1972), 178–183.

The carboxyl end groups content can be determined by dissolving about 0.8 g of polymer sample in 50 ml of o-cresol at 125°±2° C. for 15±2 minutes. After being cooled to room temperature, the solution is diluted with 30 ml of chloroform. After the addition of 0.3 ml of indicator solution (1 g of bromocresol green in 250 ml ethanol, diluted with chloroform to 11) the solution is titrated (monotone) with an ethanolic potassium hydroxide solution (0.03 mole/l) at a wavelength of 620 nm (in transmission). The equivalence point corresponds to the point of inflection of the obtained titration curve. A blank determination is carried out in the same manner.

$T_g$ and $T_m$ can be determined with the aid of a Perkin Elmer DSC-7 Differential Scanning Carolimeter. To this end, first of all, the temperature is calibrated at the onset values of the melting of indium (156.6° C.) and zinc (419.5° C.). Next, an aluminum crucible containing about 4 mg of polyester sample is heated at a rate of 20° C./min to 290° C. and kept at this temperature for 3 minutes. The crucible and its contents are then quickly cooled by chilling in liquid nitrogen before being heated at a rate of 10° C./min. The difference in heat flow between this crucible and an empty reference crucible are recorded in the form of a thermogram. The midpoint of the sudden increase in heat flow at around 80° C. constitutes the glass transition temperature $T_g$, the peak maximum at around 252° C. constitutes the polymer's melting point $T_m$.

EXAMPLES

The invention will be further illustrated with reference to the following examples, which are submitted for a better understanding of the invention and are not to be construed as being limiting in any manner whatsoever.

Polyester polymer chips with a melting temperature $T_m$ of about 253° C. were spun through a spinneret plate. Situated immediately beneath the spinneret plate was a heated tube. After passing through this heated tube the formed filaments were cooled with air in a cooling zone comprised of a perforated tube. After being passed through the cooling zone, the filaments were finished with the aid of a finish wheel. Next, the filament speed was fixed by means of 10 lays around two godets of equal diameter and equal rotational speed (pair 1). The resulting undrawn filaments were immediately passed on to a second pair of godets (pair 2). Using a Barmag type CW8 yarn winder the resulting drawn yarn was then wound through 10 wraps around a third pair of godets (pair 3).

The most important process conditions of different spinning trials are given in Table I. In Table II the properties of the resulting polyester filament yarns are presented.

The yarns were used to make cords in a manner described in this application. The properties of these cords are presented in Table III.

Example 4 is a comparative example. The crystallinity of the as-spun yarn is larger than 164. This relatively high crystallinity of the as-spun yarn prevented the material from being drawn to a draw ratio that would have resulted in a product with a combination of advantageous use properties.

TABLE I

Process conditions

| Example | 1 | 2 | 3 | 4 | 5 | 6 |
|---|---|---|---|---|---|---|
| Polymer relative viscosity | 2.26 | 2.31 | 2.23 | 2.29 | 2.29 | |
| Polymer line temperature (° C.) | 305 | 314 | 307 | 311 | 306 | |
| Spinneret plate | | | | | | |
| # orifices | 280 | 212 | 280 | 280 | 280 | 212 |
| orifice diameter (μm) | 500 | 500 | 400 | 400 | 400 | 500 |
| Heated tube | | | | | | |
| temperature (° C.) | 300 | 300 | 300 | 300 | 300 | 300 |
| length (cm) | 28 | 28 | 20 | 20 | 20 | 24 |
| Cooling air | | | | | | |
| temperature (° C.) | 40 | 40 | 20 | 20 | 20 | 60 |
| relative humidity | 65 | 65 | 65 | 65 | 65 | 65 |
| Cooling zone | | | | | | |
| length (cm) | 75 | 75 | 90 | 90 | 90 | |
| type | A | B | C | C | C | |
| As-spun yarn crystallinity (%) | 7.3 | 9 | 7 | 18 | <1 | 12.5 |
| Drawing zone | | | | | | |
| Godets pair 1 | | | | | | |
| temperature (° C.) | 56 | 51 | 80 | 80 | 80 | |
| peripheral velocity (m/min) | 3344 | 3525 | 3525 | 4525 | 2625 | 4000 |
| Godets pair 2 | | | | | | |
| temperature (° C.) | 235 | 235 | 235 | 235 | 235 | 235 |
| peripheral velocity (m/min) | 6700 | 7035 | 7035 | 7425 | 6240 | 7300 |
| Godets pair 3 | | | | | | |
| temperature (° C.) | 160 | 160 | 160 | 160 | 160 | 160 |
| peripheral velocity (m/min) | 6690 | 7030 | 7025 | 7415 | 6230 | 7290 |
| Winding speed (m/min) | 6482 | 6825 | 6798 | 7200 | 6034 | 7098 |

Cooling zone type:
A resistance to flow of the wall of the tube being higher at the centre of the tube than at its ends,
B 15 cm of the top covered up,
C 15 cm of the top not perforated

TABLE II

Properties of the resulting polyester filament yarns

| Example | 1 | 2 | 3 | 4 | 5 | 6 |
|---|---|---|---|---|---|---|
| Yarn type | A | B | A | A | A | B |
| Linear density (dtex) | 1114 | 1120 | 1109 | 1134 | 1102 | 1115 |
| Breaking tenacity (mN/tex) | 704 | 694 | 689 | 619 | 701 | 662 |
| Elongation at break (%) | 13.2 | 13.3 | 14 | 17.4 | 13.7 | 14.2 |
| Breaking toughness (J/g) | 59 | 60 | 62 | 78 | 59 | 65 |
| Shrinkage 177° C. | 5.4 | 5.7 | 4.8 | 3.7 | 5.9 | 5.8 |

Yarn type: A = 1100f280, B = 1100f212

TABLE III

| | Properties of the resulting cord | | | | | |
|---|---|---|---|---|---|---|
| Example | 1 | 2 | 3 | 4 | 5 | 6 |
| Linear density (dtex) | 3660 | 3693 | 3654 | 3715 | 3593 | 3463 |
| Breaking tenacity (mN/tex) | 591 | 597 | 592 | 514 | 588 | 574 |
| Elongation at break (%) | 19.1 | 19.4 | 19.2 | 23.6 | 17.4 | 20.8 |
| Breaking toughness (J/g) | 68 | 69 | 66 | 82 | 54 | 75 |
| Shrinkage (HAS) | 1.55 | 1.61 | 1.50 | 1.34 | 1.91 | 1.57 |
| DSF | 119 | 115 | 123 | 139 | 98 | 118 |
| Qf | 138 | 144 | 124 | 190 | <0 | 175 |

What is claimed is:

1. A cord comprising polyester filaments, wherein the cord has the following properties:

breaking tenacity≧570 mN/tex, dimensional stability>110, and quality factor>50;

and wherein the polyester filaments of the cord have the following properties:

breaking tenacity≧650 mN/tex, elongation at break>10%, and breaking toughness>40 J/g.

2. The cord according to claim 1, wherein the quality factor is larger than 100.

3. The cord according to claim 1, wherein the quality factor is larger than 125.

4. The cord according to claim 1, wherein the quality factor is larger than 150.

* * * * *

UNITED STATES PATENT AND TRADEMARK OFFICE
CERTIFICATE OF CORRECTION

PATENT NO. : 6,881,480 B2
DATED : April 19, 2005
INVENTOR(S) : Hendrikus Wilhelmus Jacobus Hofs et al.

It is certified that error appears in the above-identified patent and that said Letters Patent is hereby corrected as shown below:

Title page,
Item [56], References Cited, OTHER PUBLICATIONS, please insert
-- Eiji Imoto et al., "New Polymer Synthesis Chemistry", published by Kagaku Dohjin Company, (1964), pages 166-169 --.

Column 5,
Line 37, "$T_{g+}60$" should be -- $T_g+60$ --.
Line 59, after "250°" insert -- C --.

Signed and Sealed this

Nineteenth Day of July, 2005

JON W. DUDAS
*Director of the United States Patent and Trademark Office*